(12) United States Patent
Furukawa

(10) Patent No.: US 7,292,669 B2
(45) Date of Patent: Nov. 6, 2007

(54) NULL SYMBOL DETECTION DEVICE

(75) Inventor: Hiroki Furukawa, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 729 days.

(21) Appl. No.: 10/730,271

(22) Filed: Dec. 9, 2003

(65) Prior Publication Data

US 2004/0141573 A1   Jul. 22, 2004

(30) Foreign Application Priority Data

Dec. 10, 2002   (JP)   ............... 2002-357748

(51) Int. Cl.
*H04L 7/06* (2006.01)
(52) U.S. Cl. .................................. 375/364
(58) Field of Classification Search ............... 375/364, 375/316, 147, 340, 368; 370/509
See application file for complete search history.

(56) References Cited

U.S. PATENT DOCUMENTS 6,731,702 B1 *   5/2004   Nomura ............... 375/343
7,006,577 B2 *   2/2006   Kim ................... 375/260
2002/0042661 A1   4/2002   Kim

FOREIGN PATENT DOCUMENTS

| EP | 1 054 540 A | 11/2000 |
|---|---|---|
| JP | 11-27333 A | 1/1999 |
| JP | 2000-315990 A | 11/2000 |
| KR | 10-2001-39589 A | 5/2001 |

* cited by examiner

*Primary Examiner*—David O. Payne
*Assistant Examiner*—Leon Flores
(74) *Attorney, Agent, or Firm*—Smith Patent Office

(57) ABSTRACT

In a null symbol detection device, at the time of receiving a terrestrial digital broadcast, a null symbol can be stably detected even under a fading environment. A synchronous addition buffer group is provided subsequent to an amplitude detector so as to synchronously add an OFDM signal at a null symbol repetition period. A moving average processing unit performs a moving average operation upon synchronous addition data with the number of samples corresponding to a null symbol to output a moving average value. A transmission mode determining unit detects the minimum value among the moving average values normalized in a correction processing unit and compares levels of the minimum values to determine a reception mode. A null position detector generates a synchronous pulse at a null position.

21 Claims, 15 Drawing Sheets

F I G. 5

|  | Mode 1 | Mode 2 | Mode 3 | Mode 4 |
|---|---|---|---|---|
| Null Symbol Period (msec) | 96 | 24 | 24 | 48 |
| Null Symbol Width (msec) | 1.297 | 0.324 | 0.168 | 0.648 |
| Moving Average Width (msec) | 1.00 | 0.25 | 0.125 | 0.50 |
| Number of Samples in the Moving Average Operation | 32 | 32 | 16 | 32 |
| Number of Samples in the Null Symbol Period | 41 | 41 | 21 | 41 |
| Sampling Frequency (kHz) | 32 | 128 | 128 | 64 |

NULL SYMBOL DETECTION DEVICE

BACKGROUND OF THE INVENTION

1. Field of the Invention

The present invention relates to a null symbol detection device used for receivers in a digital broadcasting system in which a null symbol repetition period or a null symbol width is different depending on transmission modes.

2. Discussion of the Related Art

In accordance with some standards for terrestrial digital broadcasting system, a null symbol with smaller transmission power than those of other symbols including broadcasting data is repeatedly transmitted at a fixed period depending on transmission modes.

Conventional null symbol detection devices detect the symbol width of a null symbol. Such method is disclosed in, e.g., Japanese Unexamined Patent Publication No. 11-27333 (1999) and U.S. patent application Publication No. 2002-0042661. FIG. 1 is a block diagram illustrating the structural example of a conventional null symbol detection device. This null symbol detection device has a level detector 1, an interval width counter 2, a clock generator 3, a null interval width base counter 4, an interval width evaluator 5 and a synchronous signal generator 6.

The level detector 1 compares the signal level of an inputted baseband signal with a threshold to output an H-level signal when the signal level of the inputted baseband signal is less than the threshold and to output an L-level signal when the signal level thereof is equal to or more than the threshold. The interval width counter 2 detects the time width or the clock number of the interval during which the level detector 1 outputs an H-level signal. The clock generator 3 generates a reference clock and applies the same to the interval width counter 2. The null interval width base counter 4 stores standard data about a null symbol interval width in accordance with transmission modes. The interval width evaluator 5 compares data about an interval width detected in the interval width counter 2 with the standard data about the null width stored in the null interval width base counter 4 to determine whether or not a currently inputted symbol is a null symbol. The synchronous signal generator 6 generates a synchronous signal which is synchronous with the null symbol when the interval width evaluator 5 determines that the corresponding symbol is the null symbol.

Operations of the null symbol detection device illustrated in FIG. 1 will be specifically described by taking detection of null symbol in European Digital Audio Broadcasting (DAB) standard (ETS300401) for digital broadcasting as an example. In European DAB standard, four transmission modes, i.e., modes 1 to 4 are provided. For example, assume that it is known that a currently received transmission mode is the mode 1. In the mode 1, a null symbol is transmitted at a period of 96 msec. The width of the null symbol is 1.297 msec.

When a baseband signal is inputted to the level detector 1, the output of the level detector 1 is in an H-level at the position that a null symbol starts. Then, the interval width counter 2 starts its count operation. When the null symbol ends, the output of the level detector 1 is in an L-level and the interval width counter 2 stops the count operation. The interval width evaluator 5 determines whether or not the interval width detected by the interval width counter 2 is within a standard range of the null symbol width for the mode 1 stored in the null interval width base counter 4. If the detected interval width is within the standard range, it is determined that the null symbol is provided. At this period, the synchronous signal generator 6 outputs a synchronous signal which is synchronous with the null symbol. By such operations, the null symbol is detected and the transmission mode can be identified. When a plurality of modes are used, the modes are successively detected and, then, it is determined whether or not a current signal is within the standard range of the null symbol width for the corresponding mode.

Assume that a terrestrial digital broadcast in European DAB standard is received in a mobile manner. For example, in an in-vehicle receiver, a direct wave and a reflection wave complicatedly interfere with each other, so that a multipath is generated. Further, a fading may occur by movement of the on-vehicle receiver. Such factors may vary greatly the level of a received signal. The level detector 1 compares the signal level of a baseband signal with a predetermined threshold. At this time, the level detector 1 may output an H-level signal at positions other than the null symbol.

In accordance with the conventional null symbol detection device with the above-described structure, the interval width counter 2 detects the interval width when the level detector 1 outputs an H-level signal. The interval width evaluator 5 compares this interval width with a null symbol width for a predetermined mode. Thus, the null symbol detection device distinguishes a trough in a signal level generated by fading from an original null symbol.

In accordance with a detection method by the conventional null symbol detection device, however, the transmission mode of a received signal must be known in advance. Further, determination of transmission mode of the received signal and detection of the null symbol cannot be performed at the same time. Further, the width of trough in a signal level generated by fading may approximately coincide with the width of the null symbol. Then, an interval which is not for the null symbol may be erroneously detected as the null symbol. Moreover, if the null symbol coincides, in view of time, with the trough of the fading, the width of a trough in the signal level is widened significantly as compared with the width of the original null symbol, so that the null symbol may be missed in a desired transmission mode.

SUMMARY OF THE INVENTION

A null symbol detection device of the present invention performs, in terrestrial digital broadcasting, determination of transmission mode and detection of null symbol at the same time, and establishes early synchronization by detecting a null symbol with higher possibilities even under a fading environment.

In accordance with DAB terrestrial digital broadcasting, a null symbol with smaller transmission power than those of other symbols is repeatedly transmitted at a fixed period. A null symbol repetition period or a null symbol width is different depending on transmission modes. In the present invention, an amplitude detector detects the envelope of an intermediate frequency signal or a baseband signal. A synchronous addition buffer group samples the output of the amplitude detector at a fixed period by using a plurality of synchronous addition buffers and synchronously adds the resultant data at a null symbol repetition period corresponding to each of transmission modes to be received. A transmission mode determination processor performs a moving average operation upon all of synchronous addition data rows stored in the synchronous addition buffers. By detecting the minimum value of the moving average operation and the address of the synchronous addition buffer providing the minimum value for the transmission modes to be received, a transmission mode is determined. A null position detector detects, in accordance with the transmission mode determined in the transmission mode determination processor, a null symbol position from the address providing the minimum value, and generates a synchronous pulse at a null symbol start position.

BRIEF DESCRIPTION OF THE DRAWINGS

FIG. 5 is a chart showing constants in transmission modes 1, 2, 3 and 4;

DESCRIPTION OF THE PREFERRED EMBODIMENTS

Hereinafter, description will be given of null symbol detection devices according to embodiments of the present invention with reference to the drawings. As in the case of describing the conventional example, description will be given by taking European DAB standard (ETS300401) as an example.

Embodiment 1

Figure 1:
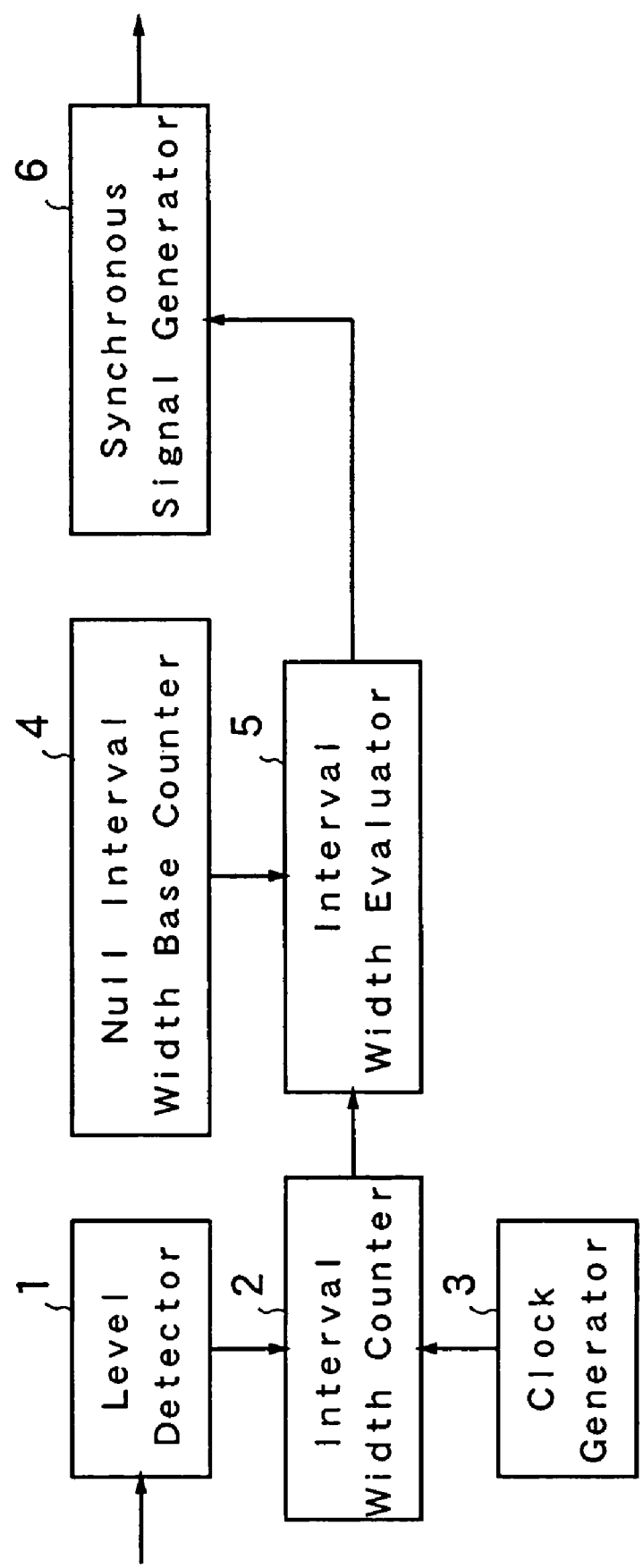
FIG. 1 is a structural view of a conventional null symbol detection device.
Figure 2:
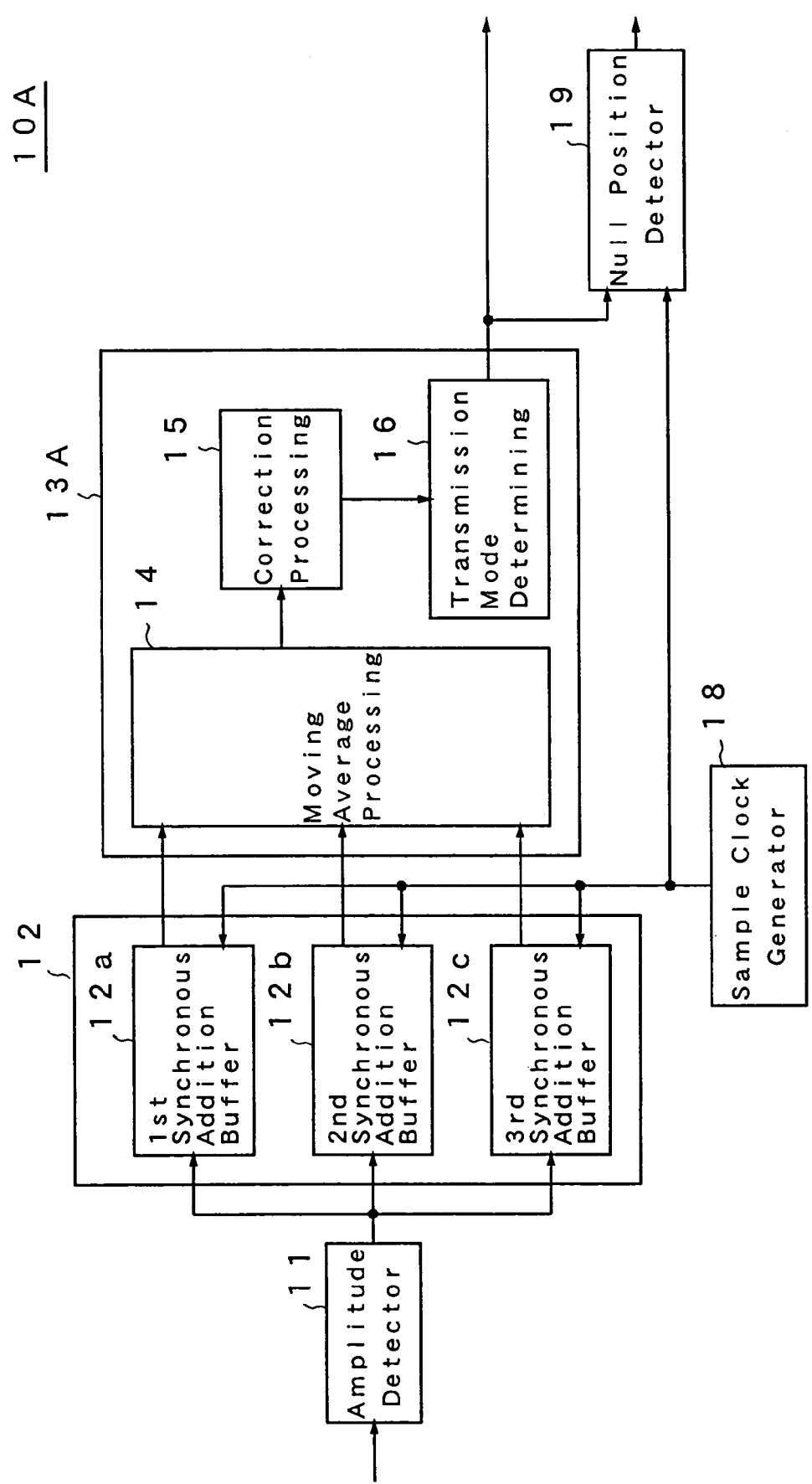
FIG. 2 is a structural view of a null symbol detection device according to a first embodiment of the present invention.

A null symbol detection device 10A illustrated in FIG. 2 is configured so as to include an amplitude detector 11, a synchronous addition buffer group 12, a transmission mode determination processor 13A, a sample clock generator 18 and a null position detector 19. The transmission mode determination processor 13A has a moving average processing unit 14, a correction processing unit 15 and a transmission mode determining unit 16.

The amplitude detector 11 detects the envelope of an inputted intermediate frequency signal or baseband signal. The synchronous addition buffer group 12 includes therein a first synchronous addition buffer 12a, a second synchronous addition buffer 12b and a third synchronous addition buffer 12c. The first synchronous addition buffer 12a is a synchronous addition buffer with 96 msec of addition period, and this addition period corresponds to a transmission mode 1. The second synchronous addition buffer 12b is a synchronous addition buffer with 48 msec of addition period, and this addition period corresponds to a transmission mode 4. The third synchronous addition buffer 12c is a synchronous addition buffer with 24 msec of addition period, and this addition period corresponds to transmission modes 2 and 3. Synchronous addition is performed so as to be synchronized with clocks from the sample clock generator 18.

The data addition number at the same address, i.e., the synchronous addition number N is different depending on each of the synchronous addition buffers. This means that the number N of synchronously adding the data for the synchronous addition buffer is varied depending on the transmission mode. For each of the synchronous addition buffers, a buffer which has a storage capacity for fetching, e.g., data with n=3072 samples on time series is used.

The transmission mode determination processor 13A performs a moving average operation upon all of synchronous addition data rows stored in the respective synchronous addition buffers of the synchronous addition buffer group 12, and detects, with respect to a transmission mode to be received, the minimum value of the moving average operation and the address of a synchronous addition buffer providing this minimum value. On the basis of the minimum value of the moving average operation and the address of the synchronous addition buffer, a transmission mode is determined.

The moving average processing unit 14 calculates a moving average operation value (also referred to as a moving average) of all synchronous addition data stored in the synchronous addition buffer group 12, i.e., the first to third synchronous addition buffers 12a to 12c, and outputs the minimum value of the moving average operation and the address of a synchronous addition buffer providing the minimum value.

Herein, the moving average operation will be described. In the moving average operation, when times $t_k$, $t_{k+1}$, $t_{k+2}$, ... are sampling timings for an inputted signal, n sampling points are allocated to sampling points of a received signal in a frame (with a frame period of TF). Then, received signals $x_j$, $x_{j+1}$, $x_{j+2}$, ... $x_{j+m-1}$ at m (m << n) adjacent sampling timings $t_j$, $t_{j+1}$, $t_{j+2}$, ... $t_{j+m-1}$ are added and the resultant added value serves as a moving average value $X_j$. For the moving average value $X_j$, the value of j is shifted backward on a time base from the initial value, so that moving average values X1, X2, ... Xn at n positions in each of frames for the respective modes can be obtained. Among the n moving average values X, the minimum moving average value is determined as Xmin and the address of Xmin is treated as a candidate for the position of a null symbol in the corresponding frame. Because this minimum value is obtained by adding positive values, it is a positive value.

The correction processing unit 15 corrects the moving average value Xmin for each of the synchronous addition buffers calculated in the moving average processing unit 14. The correction processing unit 15 divides the moving average value Xmin by a value (N*m). The value (N*m) is obtained by multiplying the number N of synchronously adding in memories of the synchronous addition buffers at the same address by the sample number m corresponding to the time width for the moving average operation. In this way, the moving average value Xmin can be normalized. The moving average value Xmin is also positive.

The transmission mode determining unit 16 compares normalized moving average values Ymin=Xmin/(m*N) for the respective transmission modes corrected in the correction processing unit 15, and determines the transmission mode by detecting the smallest one among three or four types of results of the moving average operation. The null position detector 19 detects, as a null symbol start position, the start address providing the minimum value of the moving average operation corresponding to the transmission mode determined in the transmission mode determining unit 16. Specifically, the null position detector 19 outputs, for the start address position, a pulse which is synchronous with the sample clock generator 18. Thus, the null position detector 19 detects the null position.

In accordance with this embodiment, for example, the frequency of clocks generated by the sample clock generator 18 for the modes 2 and 3 is 128 kHz, the clock frequency for the mode 1 is 32 kHz and the clock frequency for the mode 4 is 64 kHz. The null symbol width is 1.297 msec for the mode 1, 0.324 msec for the mode 2, 0.168 msec for the mode 3 and 0.648 msec for the mode 4. Even in the mode 3 with the shortest (i.e., 0.168 msec) null symbol width, synchronous addition can be performed for m=21 sample points in a null symbol width. A time resolution required for detection of the null symbol position can be obtained.

Figure 3:
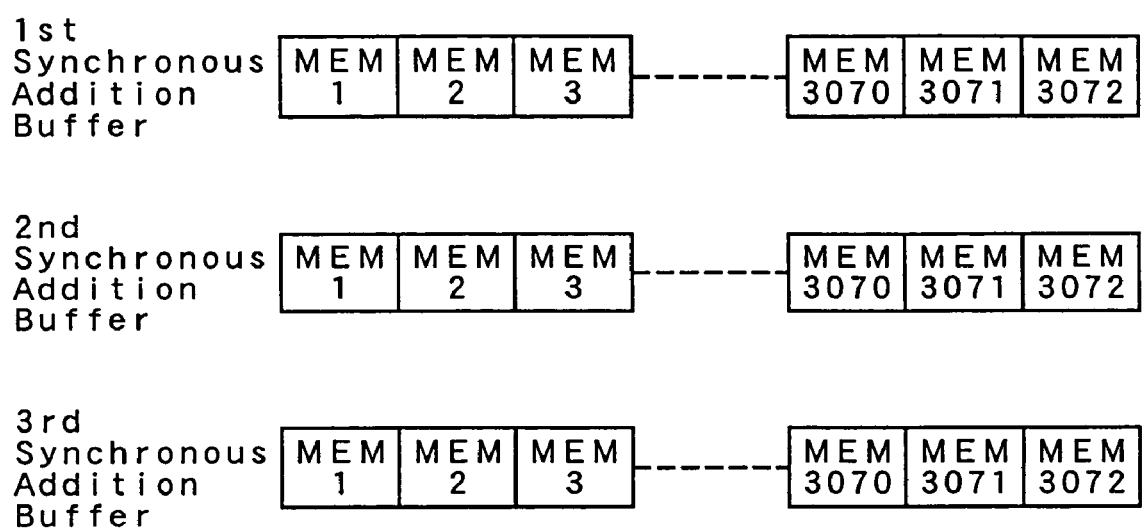
FIG. 3 is a block diagram illustrating details of a synchronous addition buffer group according to the first embodiment and a second embodiment of the present invention.

In the modes 2 and 3 with the shortest (i.e., 24 msec) null symbol repetition period TF, as illustrated in FIG. 3, a synchronous addition buffer with the storage capacity of n=3072 samples is required. In the mode 1 with the longer (e.g., 96 msec) null symbol repetition period, the sampling frequency of a signal detected in the amplitude detector 11 is ¼ of 128 kHz, i.e., 32 kHz. Under this case, as in the case of 24 msec of the null symbol period, the synchronous addition buffer with the storage capacity of n=3072 samples is required. Similarly, in the mode 4 with 48 msec of the null symbol period, the sampling frequency is ½ of 128 kHz, i.e., 64 kHz. Under this case also, the synchronous addition buffer with a storage capacity of 3072 samples is required.

As described above, the storage capacity (the number of memories) of the synchronous addition buffer is fixed to be n samples regardless of the null symbol repetition period TF. This enables the synchronous addition buffers for the modes 1 and 4 with longer synchronous addition period than that of the mode 2 to be realized with the memory which has the same capacity as that of the mode 2, resulting in reduction in memories. For example, three synchronous addition buffers may be configured by three memories each of which is 8 bits and 3072 words. Further, when the memory word length is determined as 24 bits in advance at the time of mounting, three synchronous addition buffers each of which has 8 bits can be combined to realize a memory with a width of 24 bits and 3072 words. As a result, a memory resource can be saved.

Figure 4A:
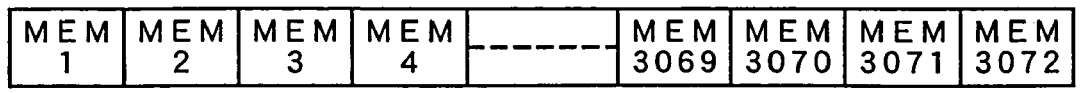
FIGS. 4A and 4B are descriptive views of forming a ring buffer in the synchronous addition buffer at the time of performing a moving average operation in null symbol detection devices according to the first and second embodiments.
Figure 4B:
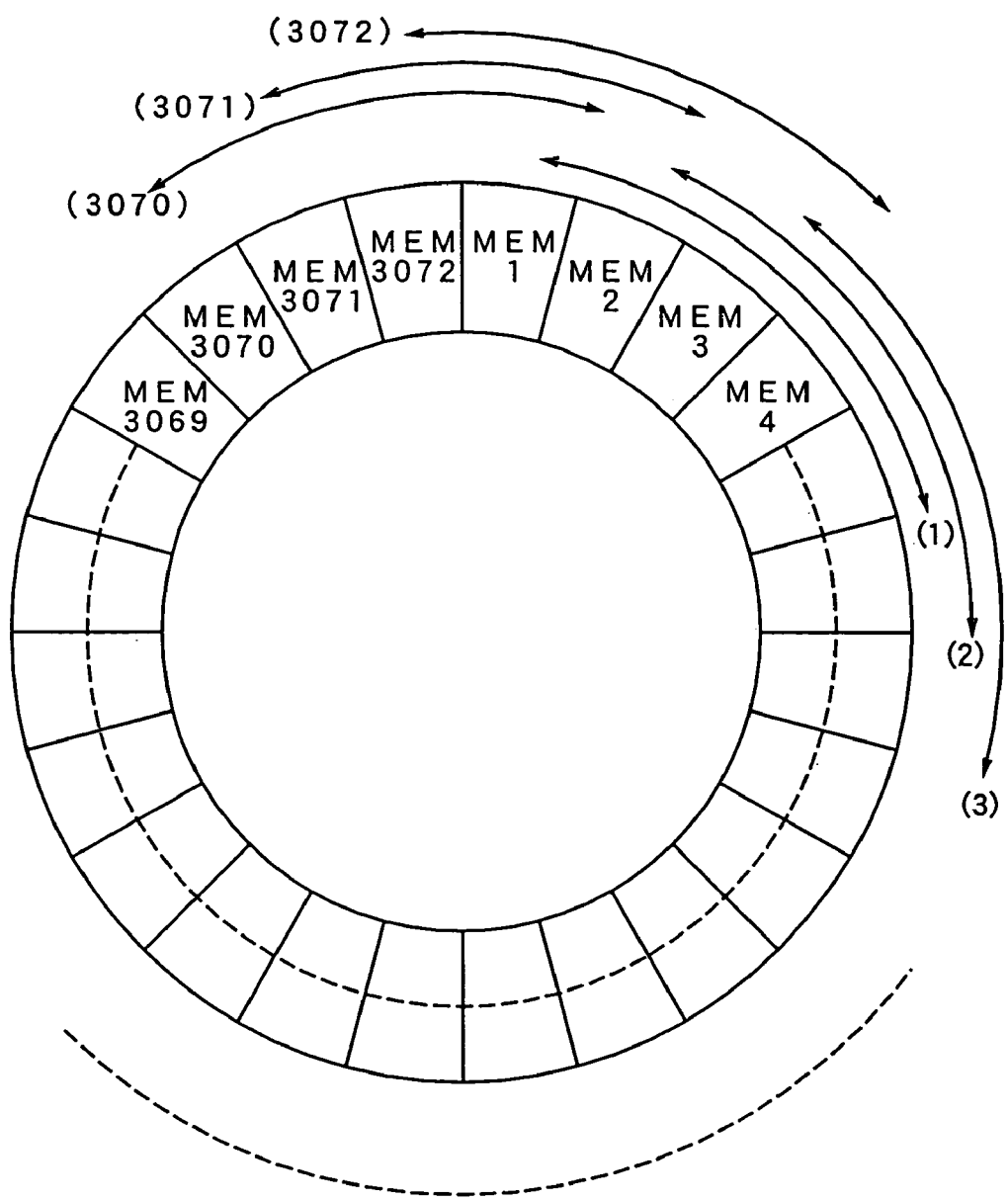

As illustrated in FIG. 4A, each of the synchronous addition buffers 12a to 12c is configured by a memory with a storage capacity of 3072 samples. For the moving average operation in the moving average processing unit 14, each of the synchronous addition buffers illustrated in FIG. 4A is considered as a ring buffer as shown in FIG. 4B. The start address of the moving average operation subsequent to addition is successively shifted and the moving average operation is performed so that all memory cells can be the start address.

Referring to FIG. 4B, the address of memory cell that the moving average operation starts proceeds such as (1)→(2)→(3)→ ... (3071)→(3072). In accordance with this embodiment, when the time width of the moving average operation is about 77% of the null symbol width t for each of the transmission modes, it is 1.00 msec for the mode 1, 0.25 msec for the mode 2, 0.125 msec for the mode 3 and 0.50 msec for the mode 4. When converting such time widths into the number m of data for the moving average operation, the modes 1, 2 and 4 are 32 samples and the mode 3 is 16 samples. As described above, constants for the transmission modes 1, 2, 3 and 4 is shown in FIG. 5.

Figure 6:
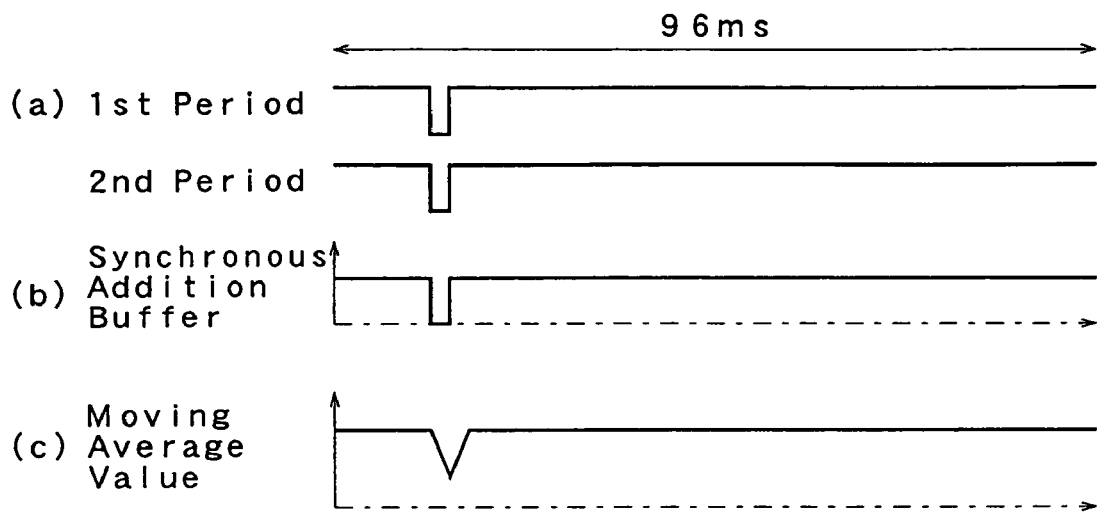
FIG. 6 is an output chart of a first synchronous addition buffer and a moving average processing unit when a signal of the mode 1 is received in the null symbol detection device according to the first embodiment.
Figure 7:
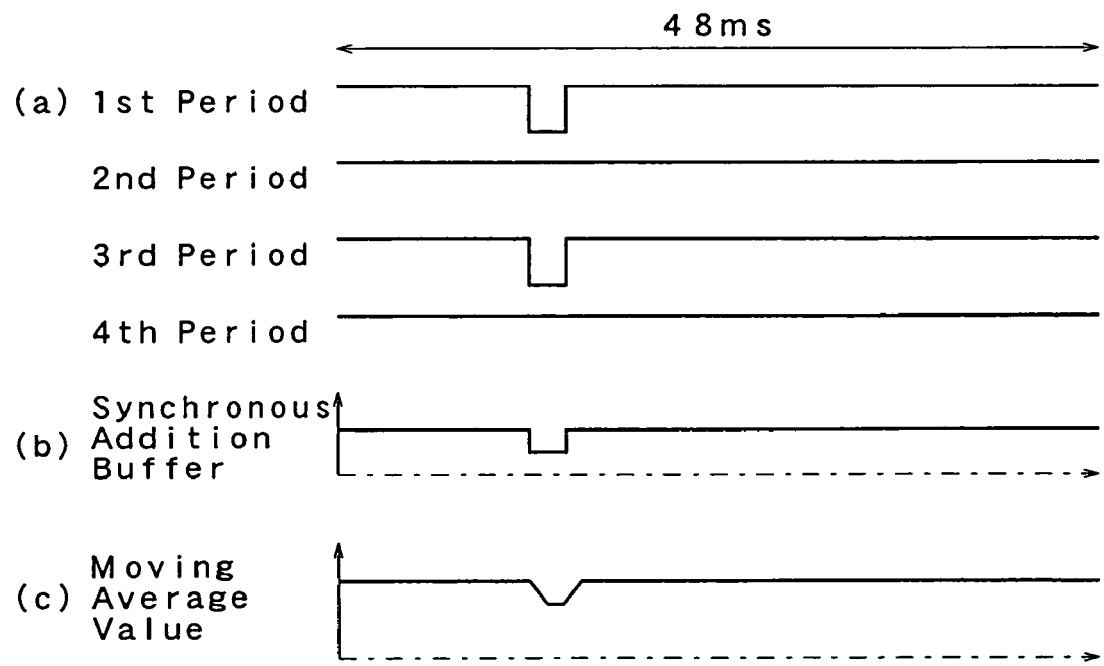
FIG. 7 is an output chart of a second synchronous addition buffer and the moving average processing unit when the signal of the mode 1 is received in the null symbol detection device according to the first embodiment.
Figure 8:
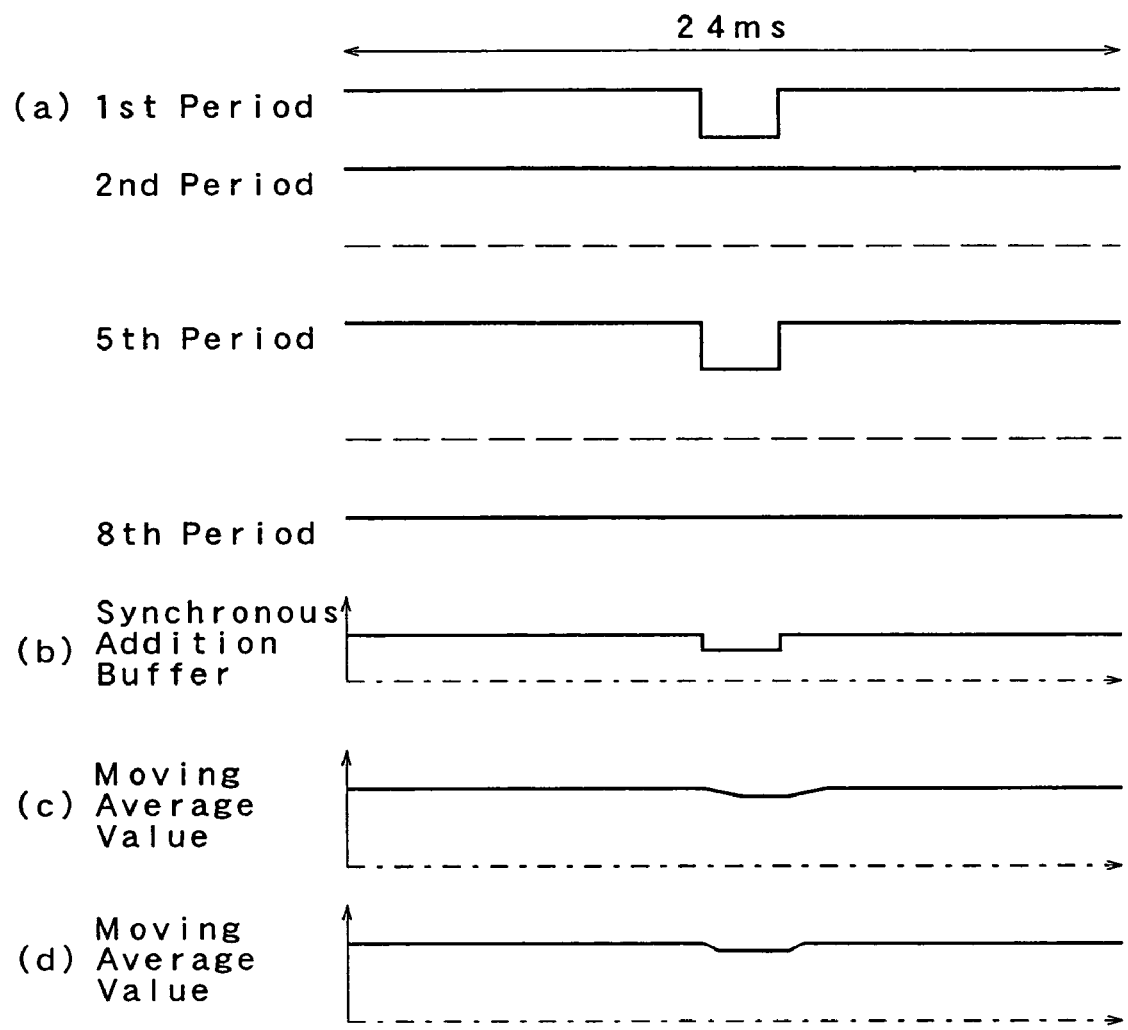
FIG. 8 is an output chart of a third synchronous addition buffer and the moving average processing unit when the signal of the mode 1 is received in the null symbol detection device according to the first embodiment.

FIGS. 6 to 8 illustrate time charts illustrating operations of the null symbol detection device 10A when a signal of the mode 1 is inputted. FIG. 6-(a) illustrates output charts for two periods of outputs from the amplitude detector 11 to be synchronously added in the first synchronous addition buffer 12a. FIG. 6-(b) illustrates an output chart of the synchronous addition buffer after synchronous addition. FIG. 6-(c) is an output chart of a moving average value corresponding to the mode 1 calculated in the moving average processing unit 14. Long dashed short dashed lines illustrated in FIG. 6-(b) and FIG. 6-(c) serving as a horizontal axis indicate a zero level.

FIG. 7-(a) illustrates output charts for four periods of outputs from the amplitude detector 11 to be synchronously added in the second synchronous addition buffer 12b. FIG. 7-(b) illustrates an output chart of the synchronous addition buffer after synchronous addition. FIG. 7-(c) illustrates an output chart of moving average value corresponding to the mode 4 calculated in the moving average processing unit 14. Illustrated long dashed short dashed lines serving as a horizontal axis also indicate a zero level.

FIG. 8-(a) illustrates output charts for eight periods of outputs from the amplitude detector 11 to be synchronously added in the third synchronous addition buffer 12c. FIG. 8-(b) illustrates an output chart of the synchronous addition buffer after synchronous addition. FIG. 8-(c) illustrates an output chart of moving average value corresponding to the mode 2 calculated in the moving average processing unit 14. FIG. 8-(d) illustrates an output chart of moving average value corresponding to the mode 3 calculated in the moving average processing unit 14. Illustrated long dashed short dashed lines serving as a horizontal axis also indicate a zero level.

Referring to FIG. 8-(a), with respect to the output of the amplitude detector 11, repeated portions are partially omitted by using dashed lines. The synchronous addition number varies, e.g., two in FIG. 6, four in FIG. 7 and eight in FIG. 8. Referring to FIGS. 6-(b), 7-(b) and 8-(b), illustrated values of the synchronous addition operation are normalized by the synchronous addition number N so that the difference between levels of these values due to the difference in the synchronous addition number N is eliminated. The synchronous addition number and the number of samples for the moving average operation are the same for the respective buffers, and the resultant values are normalized in the correction processing unit 15 by a value-obtained by multiplying the synchronous addition number N by the sample number m for the moving average operation. Thus, errors in mode determination caused by such differences cannot be generated in the transmission mode determining unit 16.

Comparing minimum values of the moving average operation in FIGS. 6 to 8, the smallest minimum value, i.e., the minimum value approximating the zero level indicated by a long dashed short dashed line is an output value of the first synchronous addition buffer 12a. This value is obtained when a signal of the mode 1 is inputted to the first synchronous addition buffer 12a. With respect to the second synchronous addition buffer 12b for the mode 4, a null symbol is received only in an alternating period in the synchronous addition. Thus, the minimum value in the synchronous addition operation is larger than a zero level as illustrated in FIG. 7-(b). As a result, as illustrated in FIG. 7-(c), the minimum value after the moving average operation is larger than the minimum value for the mode 1. With respect to the third synchronous addition buffer 12c for the modes 2 and 3, as illustrated in FIG. 8-(c) and FIG. 8-(d), the minimum values after the moving average operation become much larger.

Accordingly, as illustrated in FIG. 6, the minimum value for the mode 1 is the smallest among the minimum values for the moving average operation subjected to the correction processing corresponding to the respective modes. Then, it is determined in the transmission mode determining unit 16 that a currently received signal is in the mode 1.

Referring to FIGS. 6 to 8, with respect to the transmission modes with shorter null symbol period than that of an original received signal, by performing the synchronous addition operation in the synchronous addition buffer group 12, the minimum value of the synchronous addition becomes larger than the minimum value of a synchronous addition buffer in the same null symbol period as that of the original received signal. Thus, the transmission mode determining unit 16 hardly determines by mistake a transmission mode for the received signal.

Figure 9:
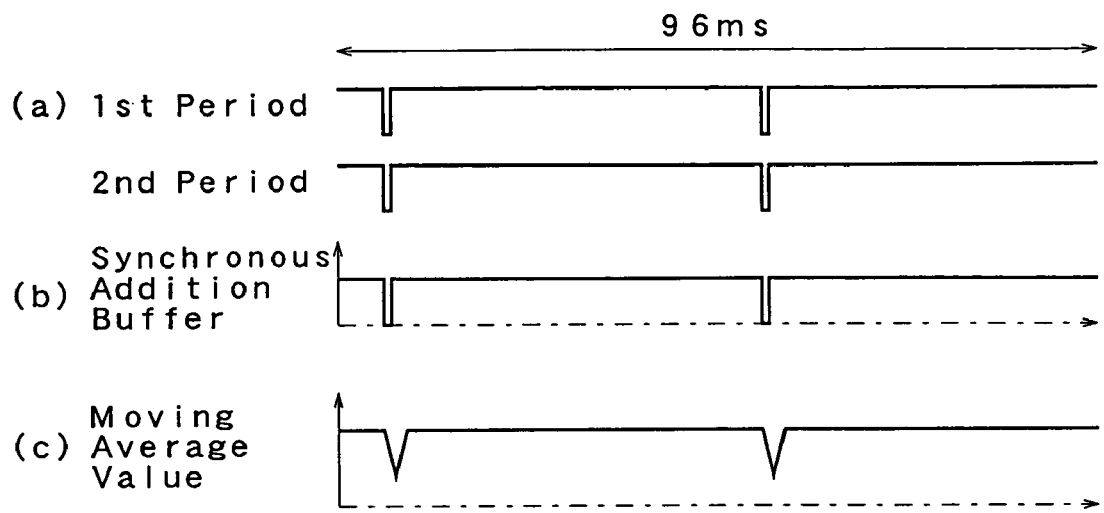
FIG. 9 is an output chart of the first synchronous addition buffer and the moving average processing unit when the signal of the mode 4 is received in the null symbol detection device according to the first embodiment.
Figure 10:
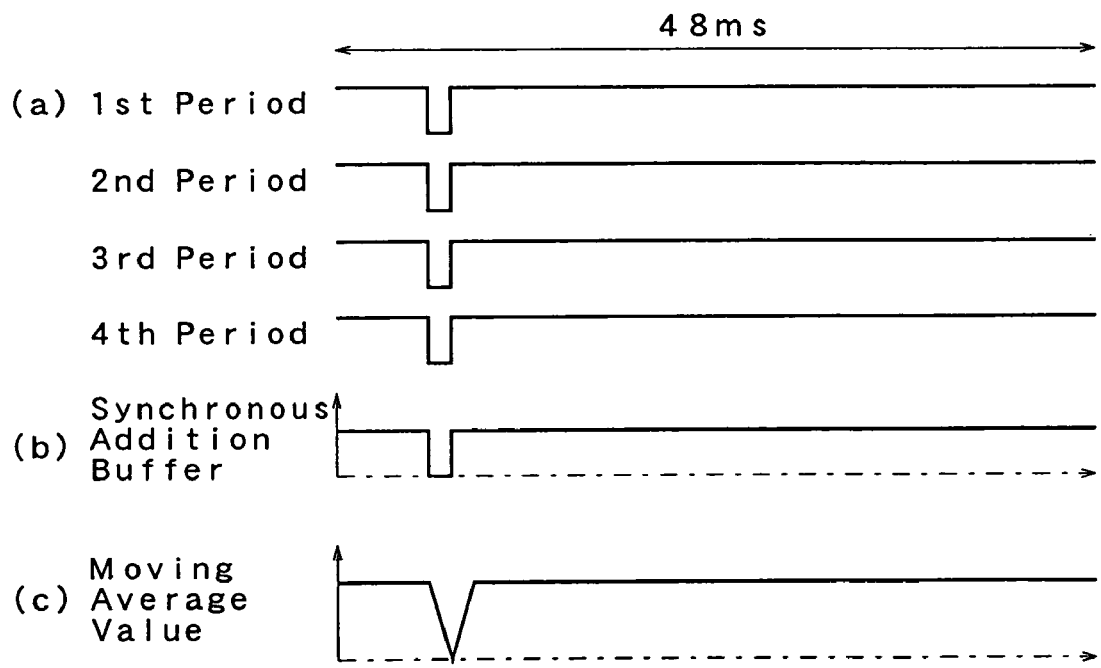
FIG. 10 is an output chart of the second synchronous addition buffer and the moving average processing unit when the signal of the mode 4 is received in the null symbol detection device according to the first embodiment.
Figure 11:
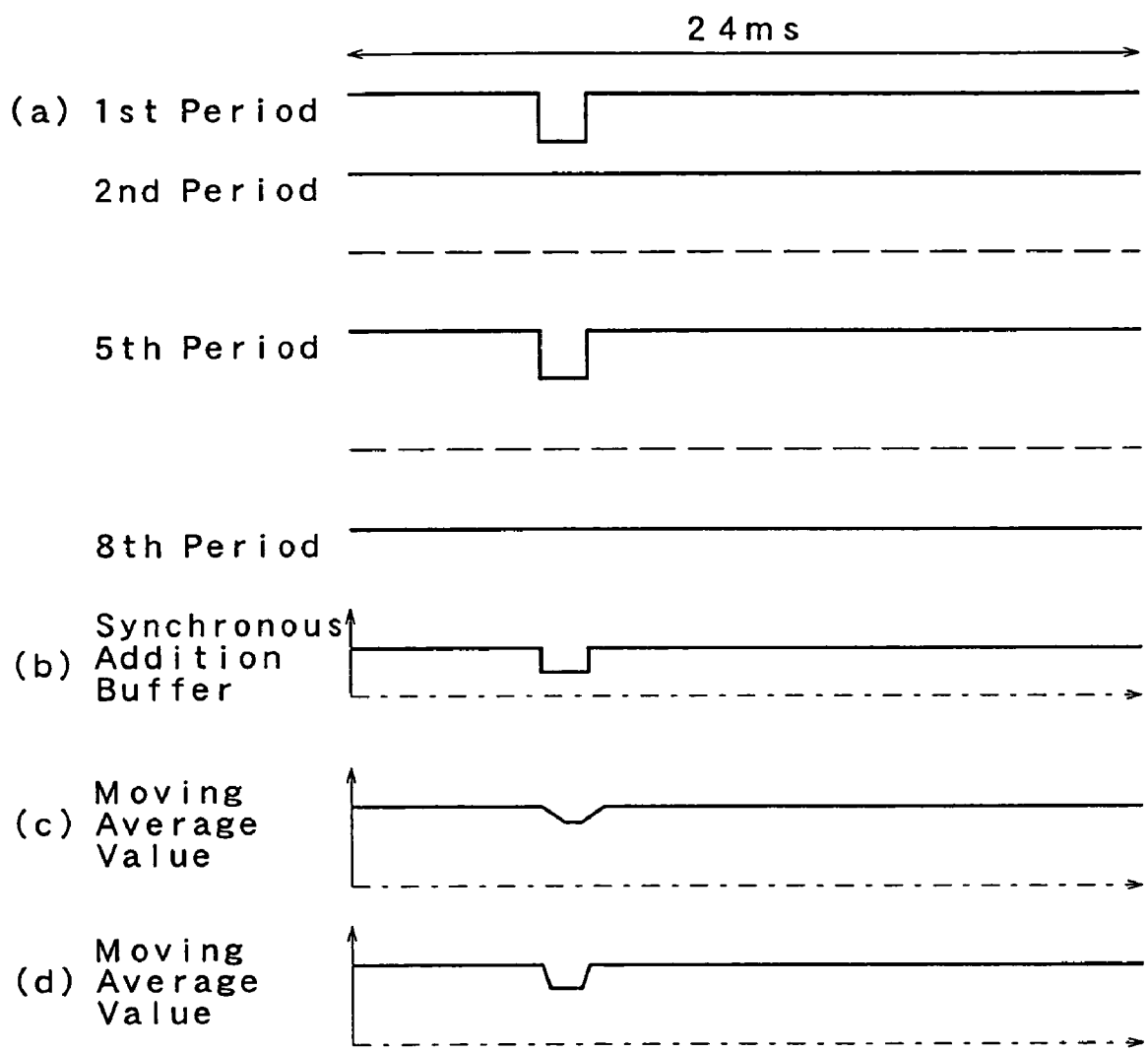
FIG. 11 is an output chart of the third synchronous addition buffer and the moving average processing unit when the signal of the mode 4 is received in the null symbol detection device according to the first embodiment.

FIGS. 9 to 11 illustrate time charts of the respective sections illustrating operations of the null symbol detection device 10A when a signal of the mode 4 is inputted. FIG. 9 is a descriptive view illustrating operations of the first synchronous addition buffer 12a and the moving average processing unit 14 when an intermediate frequency signal of the mode 4 is received. FIG. 10 is a descriptive view illustrating operations of the second synchronous addition buffer 12b and the moving average processing unit 14 when the intermediate frequency signal of the mode 4 is received. FIG. 11 is a descriptive view illustrating operations of the third synchronous addition buffer 12c and the moving average processing unit 14 when the intermediate frequency signal of the mode 4 is received.

Operational conditions are the same as those of FIGS. 6 to 8 except for the mode of a received signal. As illustrated in FIG. 11, in the third synchronous addition buffer 12c, same as described above in FIG. 8, the level of the minimum value in the result of the third synchronous addition is increased and the minimum value of the moving average operation is also increased. As illustrated in FIGS. 9 and 10, for the first synchronous addition buffer 12a, the minimum value in the result of the synchronous addition is small as the minimum value for the second synchronous addition buffer 12b. In the second synchronous addition buffer 12b illustrated in FIG. 10, the moving average width is wider than the null symbol width of the mode 1 illustrated in FIG. 9. Thus, the minimum value of the moving average operation for the second synchronous addition buffer 12b becomes smaller. The transmission mode determining unit 16 determines that a currently received signal is in the mode 4.

Referring to FIGS. 9 and 10, with respect to a transmission mode with wider null symbol width than that of an original received signal, by performing the moving average operation in the moving average processing unit 14, the minimum value of the moving average operation becomes large. As a result, the transmission mode determining unit 16 cannot erroneously determine such transmission mode as the transmission mode of the received signal.

Figure 12:
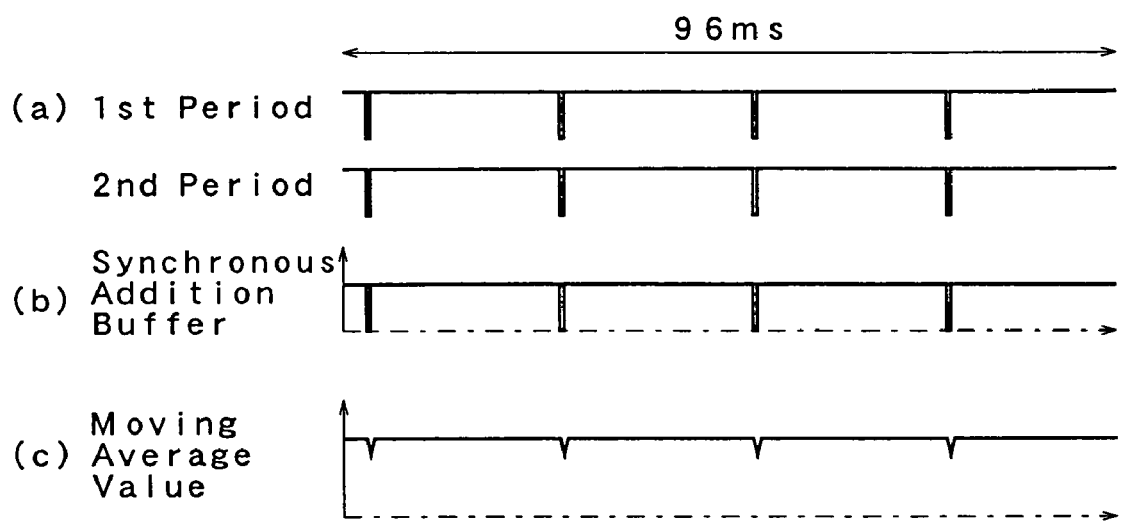
FIG. 12 is an output chart of the first synchronous addition buffer and the moving average processing unit when a signal of the mode 2 is received in the null symbol detection device according to the first embodiment.
Figure 13:
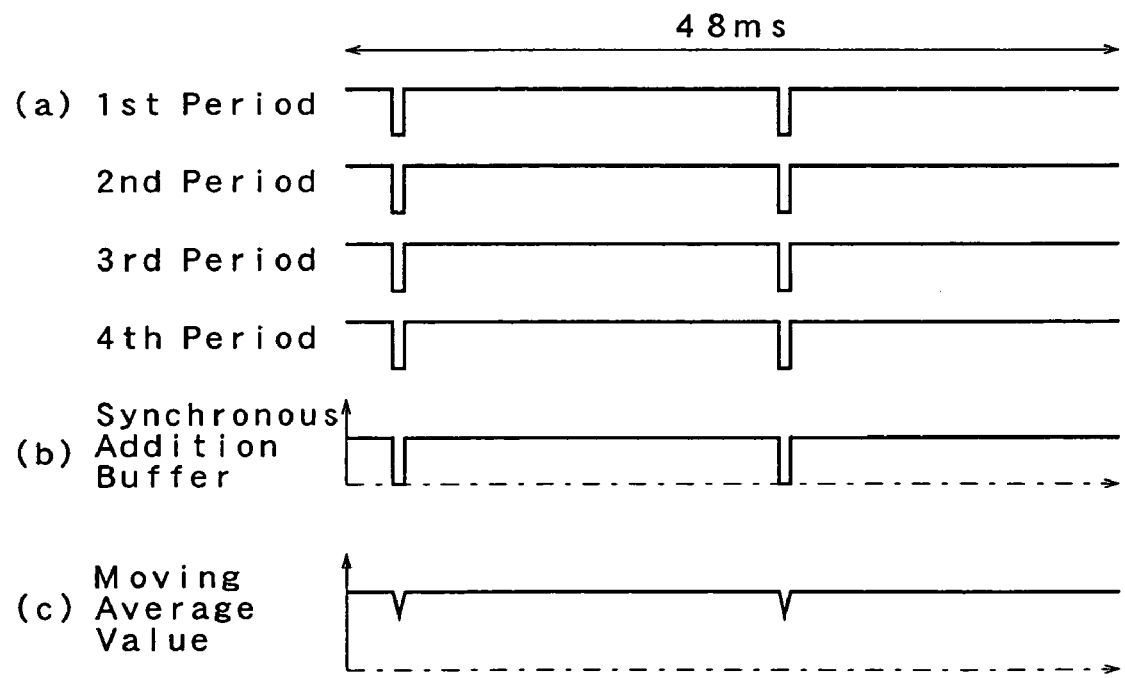
FIG. 13 is an output chart of the second synchronous addition buffer and the moving average processing unit when the signal of the mode 2 is received in the null symbol detection device according to the first embodiment.
Figure 14:
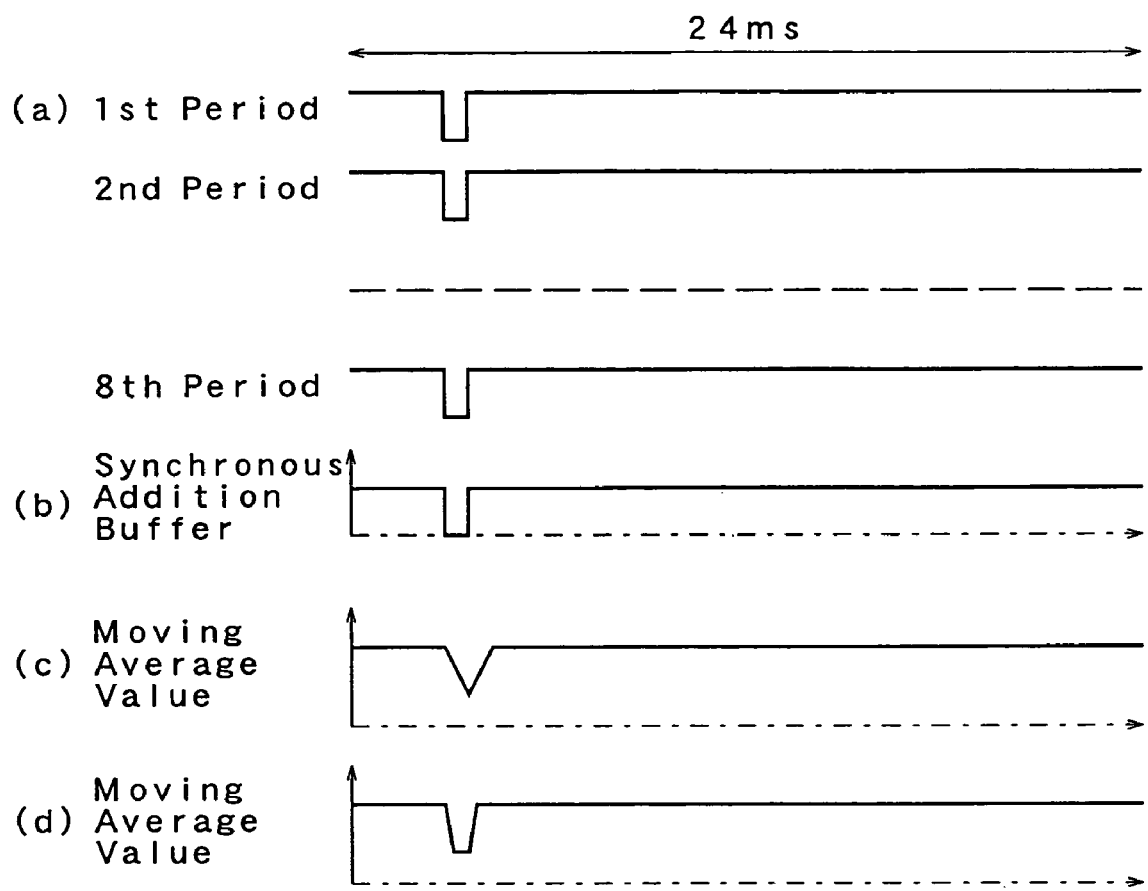
FIG. 14 is an output chart of the third synchronous addition buffer and the moving average processing unit when the signal of the mode 2 is received in the null symbol detection device according to the first embodiment.

FIGS. 12 to 14 illustrate time charts illustrating operations of the null symbol detection device 10A when a signal of the mode 2 is inputted. FIG. 12 is a descriptive view illustrating operations of the first synchronous addition buffer 12a and the moving average processing unit 14 when an intermediate frequency signal of the mode 2 is received. FIG. 13 is a descriptive view illustrating operations of the second synchronous addition buffer 12b and the moving average processing unit 14 when an intermediate frequency signal of the mode 2 is received. FIG. 14 is a descriptive view illustrating operations of the third synchronous addition buffer 12c and the moving average processing unit 14 when an intermediate frequency signal of the mode 2 is received. Operational conditions and the way of description in the figures are the same as those of FIGS. 6 to 8 except for the mode of a received signal.

In the case of the mode 2, the null symbol period of the received signal is 24 msec. Thus, the minimum values in the first, second and third synchronous addition buffers 12a, 12b and 12c in the synchronous addition buffer group become smaller as illustrated in FIGS. 12 to 14. Nevertheless, the minimum values of the moving average operation for the modes 1 and 4 having wider moving average width than that of the mode 2 become larger as illustrated in FIGS. 12 and 13.

FIG. 14-(c) is an output chart of moving average value corresponding to the mode 2 calculated in the moving average processing unit 14. FIG. 14-(d) is an output chart of moving average value corresponding to the mode 3 calculated in the moving average processing unit 14. As seen from these figures, the minimum values of the moving average operation for the modes 2 and 3 are the smallest among minimum values for other modes. The transmission mode determining unit 16 selects the mode 2 with priority when, for the modes 2 and 3, the amplitudes of the minimum values of the moving average operation subjected to correction in the correction processing unit 15 are substantially the same. According to this example, the transmission mode determining unit 16 determines as the mode 2.

Figure 15:
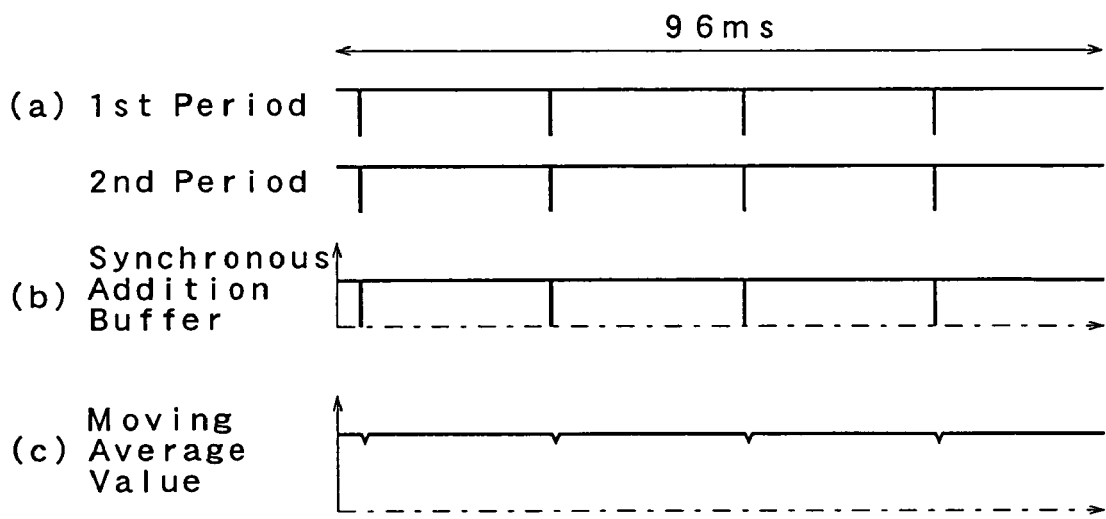
FIG. 15 is an output chart of the first synchronous addition buffer and the moving average processing unit when a signal of the mode 3 is received in the null symbol detection device according to the first embodiment.
Figure 16:
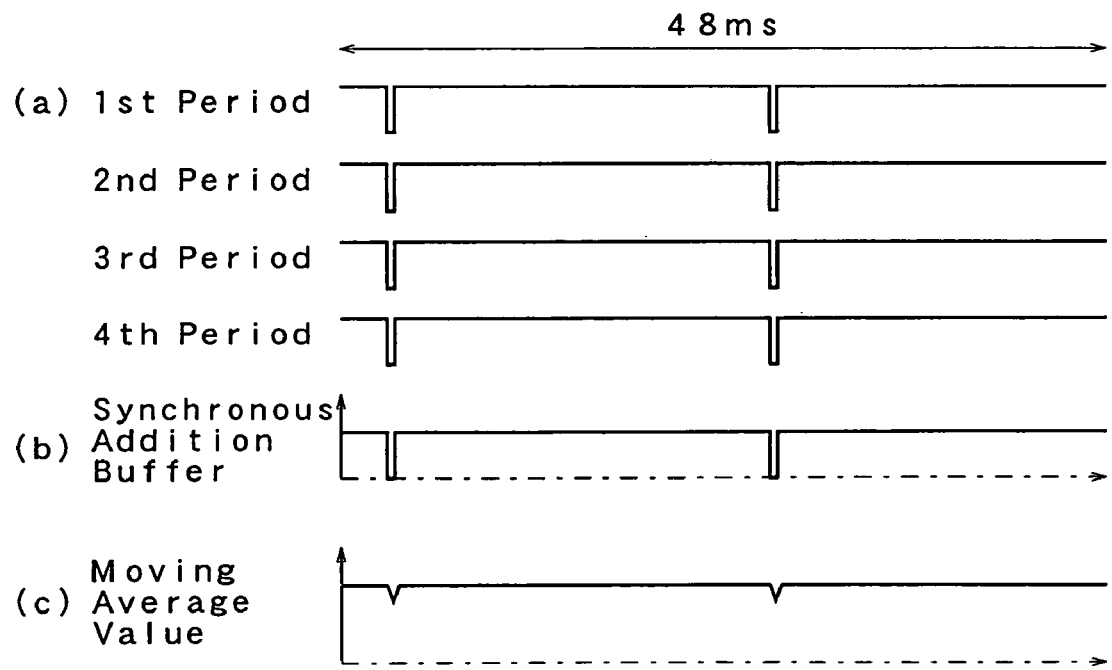
FIG. 16 is an output chart of the second synchronous addition buffer and the moving average processing unit when the signal of the mode 3 is received in the null symbol detection device according to the first embodiment.
Figure 17:
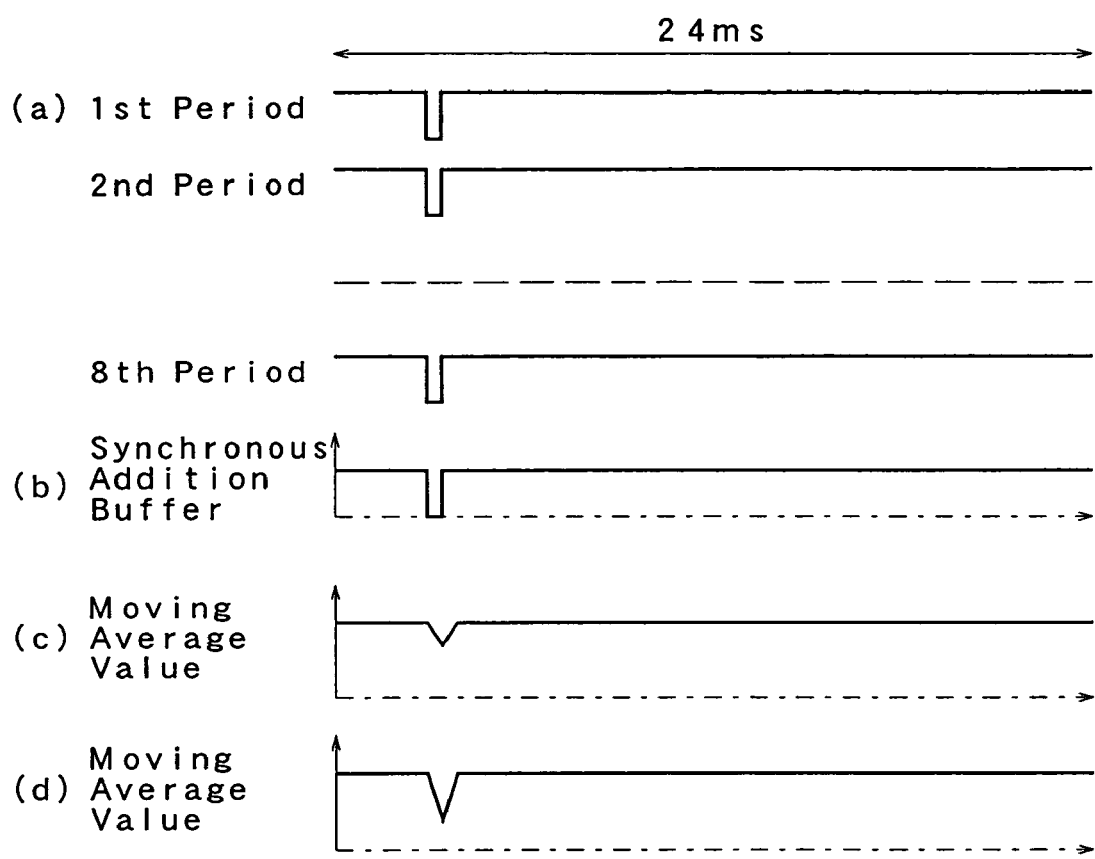
FIG. 17 is an output chart of the third synchronous addition buffer and the moving average processing unit when the signal of the mode 3 is received in the null symbol detection device according to the first embodiment.

FIGS. 15 to 17 illustrate time charts of operations of the null symbol detection device 10A when the mode 3 is inputted. FIG. 15 is a descriptive view illustrating operations of the first synchronous addition buffer 12a and the moving average processing unit 14 when an intermediate frequency signal in the mode 3 is received. FIG. 16 is a descriptive view illustrating operations of the second synchronous addition buffer 12b and the moving average processing unit 14 when an intermediate frequency signal in the mode 3 is received. FIG. 17 is a descriptive view illustrating operations of the third synchronous addition buffer 12c and the moving average processing unit 14 when an intermediate frequency signal in the mode 3 is received. Operational conditions and the way of description in the figures are the same as those of FIGS. 6 to 8 except for the mode of a received signal.

In the mode 3, the original null symbol period of a received signal is 24 msec. Thus, the minimum values in the first to third synchronous addition buffers in the synchronous addition buffer group become smaller as illustrated in FIGS. 15-(b), 16-(b) and 17-(b). On the other hand, the minimum values of the moving average operation for the modes 1 and 4 having wider moving average width than that of the mode 2 become larger than that of the mode 3 as illustrated in FIGS. 15 and 16. Further, the moving average width corresponding to the mode 2 is about twice as wide as the null symbol width of the mode 3. Thus, the minimum value of the moving average operation in the mode 2 illustrated in FIG. 17-(c) is larger than that of the mode 3 illustrated in FIG. 17-(d). As a result, the minimum value of the moving average operation in the mode 3 becomes smaller, and the transmission mode determining unit 16 determines as the mode 3.

When the mode of a received signal is determined as described above in the transmission mode determining unit 16, the null position detector 19 illustrated in FIG. 2 estimates the time when the next null symbol starts from the address of the synchronous addition buffer providing the minimum value of the moving average operation corresponding to the determined transmission mode. Then, at the time when the null symbol starts, the null position detector 19 outputs a signal NULDET.

Figure 18:
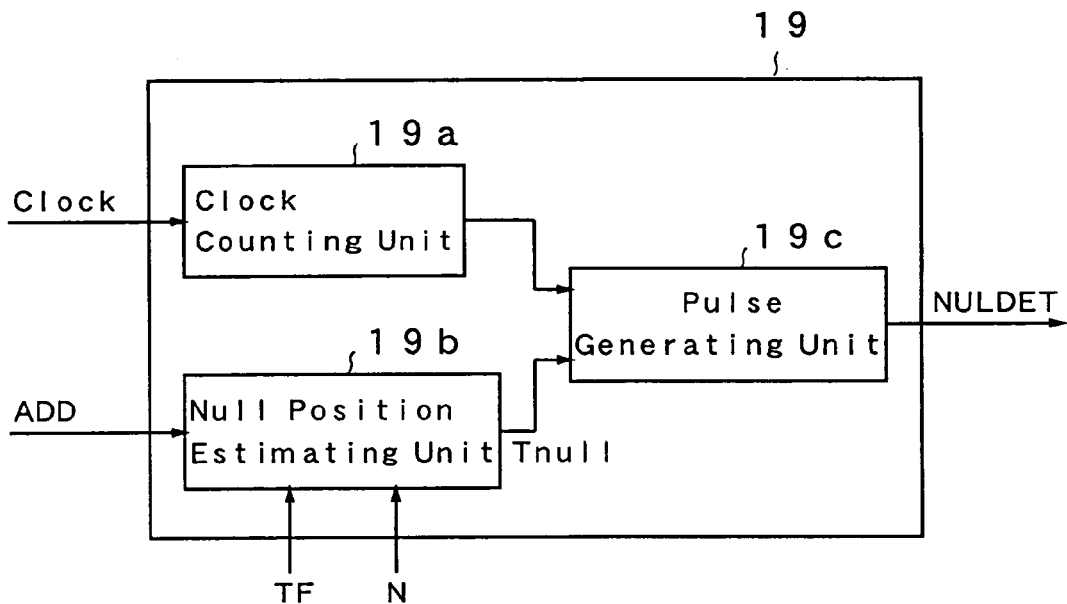
FIG. 18 is a block diagram illustrating details of the null position detector in the null symbol detection device according to the first embodiment.

FIG. 18 is a block diagram illustrating the internal structure of the null position detector 19. The null position detector 19 has a clock counting unit 19a, a null position estimating unit 19b and a pulse generating unit 19c. The clock counting unit 19a counts clocks at the same time when synchronous addition starts. The null position estimating unit 19b estimates as the time $T_{null}$ when the next null symbol starts by using values from an address ADD and the synchronous addition number N. The address ADD of synchronous addition buffer provides the minimum value of the moving average operation corresponding to the deter- mined transmission mode. The pulse generating unit 19c compares the timing of the null position estimated by the null position estimating unit 19b with a value from the clock counting unit 19a to generate a pulse when the null position coincides with the value.

The null position estimating unit 19b estimates the next null position in accordance with the following expression (1):

$$T_{null} = (N+1)*TF + ADD \quad (1),$$

wherein $T_{null}$ indicates the time when the next null symbol starts. N indicates the synchronous addition number. TF indicates the null symbol period of a determined mode and its unit is the number of clocks in the sample clock generator 18. ADD indicates the address of a synchronous addition buffer providing the minimum value of the moving average operation. 1 is added to N in the expression (1) because the time corresponding to a frame is provided in order to ensure the time for the moving average operation and the mode determination. The added value may not be 1.

The resultant time $T_{null}$ when the next null symbol starts serves as the time when the minimum value is provided in signals shown in (c) and (d) in FIGS. 6 to 17. The normal time when the null symbol starts is, however, earlier than the time $T_{null}$ by $t_{null}/2$ samples (wherein $t_{null}$ indicates the width of interval in which the level of moving average value is decreased).

As described above, the amplitude level of an intermediate frequency signal or a baseband signal can be simultaneously added in a synchronous addition buffer with the same synchronous addition period as a null symbol repetition period. By performing the moving average operation upon the data stored in the synchronous addition buffers with moving average operation widths corresponding to the respective transmission modes, a transmission mode is determined and the correct null symbol start position can be estimated. The aforementioned width of the moving average operation corresponds to 0.5 to 1.0 τ of samples, i.e., m samples wherein the null symbol width for the transmission modes is indicated by τ.

Figure 19:
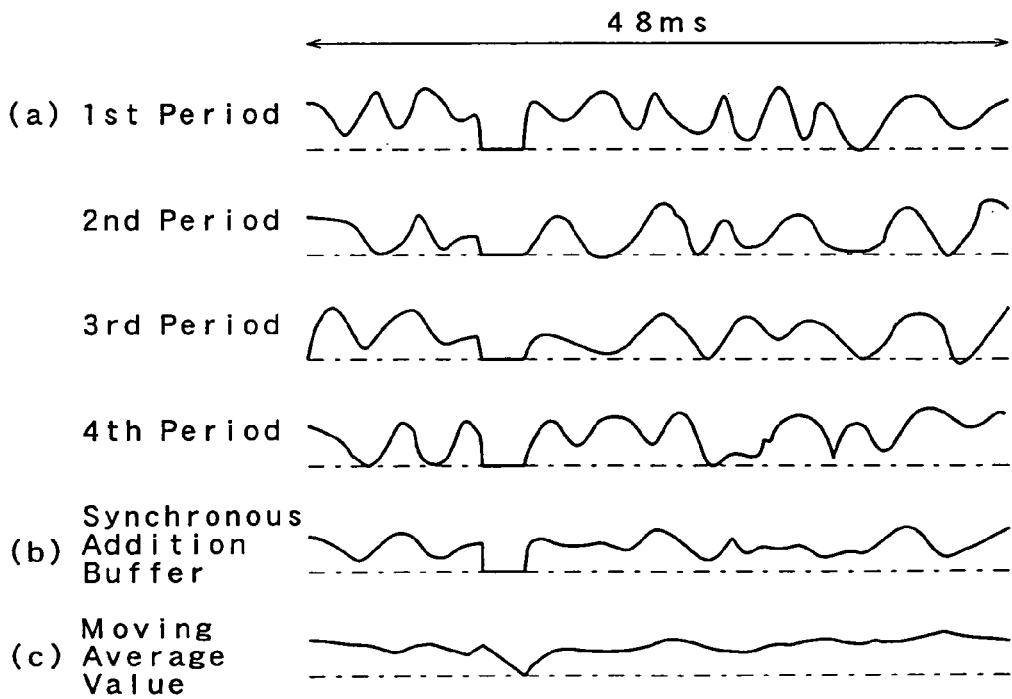
FIG. 19 is an output chart of the second synchronous addition buffer and the moving average processing unit when a signal of the mode 4 subjected to fading is received in the null symbol detection device according to the first embodiment.

Next, a signal processing method when the amplitude of a received signal varies with the time because of fading and peaks and troughs may be generated in the level of an intermediate frequency signal or a baseband signal. FIG. 19 illustrates a time chart of the operation of the null symbol detection device when fading occurs in a received signal.

FIG. 19-(a) illustrates variations in amplitude for the respective inputs when a signal in the mode 4 is received. FIG. 19-(b) illustrates synchronous addition data of the second synchronous addition buffer 12b. FIG. 19-(c) illustrates moving average value corresponding to the mode 4. In the illustrated figure, the synchronous addition number is four. As illustrated in FIG. 19-(a), the amplitude level varies greatly because of fading and thus it is difficult to detect as data with 48 msec of the null symbol period. As illustrated in FIG. 19-(b), however, by performing the synchronous addition at a period of 48 msec in the second synchronous addition buffer 12b, peaks and troughs other than a null symbol are averaged and large depressions other than a null symbol are reduced. Further, by performing the moving average operation corresponding to the mode 4 upon the synchronous addition buffer, depressions that are narrower than the null symbol width of the mode 4 are raised as moving average values. On the other hand, the amplitude level of the null symbol position becomes smaller after the synchronous addition. Thus, the minimum value among moving average values for the mode 4 is the smallest.

As described above, the synchronous addition operation has effects of averaging peaks and troughs in signal level irregularly occurred by fading and removing large depressions. Further, depressions that are narrower than the null symbol width for the respective modes can be removed by performing the moving average operation upon the synchronous addition data in accordance with the respective modes. As a result, the transmission mode determining unit 16 hardly performs error detection.

The transmission mode determining unit 16 may use only the minimum value of the moving average operation smaller than a predetermined value for mode determination. When the minimum value of the moving average operation used for determination cannot be detected, the transmission mode determining unit 16 outputs that determination of the transmission mode is impossible. Because of this operation, a user can be informed that a desired broadcast wave cannot be received.

In accordance with the first embodiment, the sampling frequency of the first synchronous addition buffer 12a is set to be ¼ of sampling frequency of the third synchronous addition buffer 12c and the sampling frequency of the second synchronous addition 12b is set to be ½ of the sampling frequency of the third synchronous addition buffer 12c. A received signal may be sampled by using the same sampling frequency. The first synchronous addition buffer 12a may synchronously add average values for four samples and the second synchronous addition buffer 12b may synchronously add average values for two samples.

Embodiment 2

Figure 20:
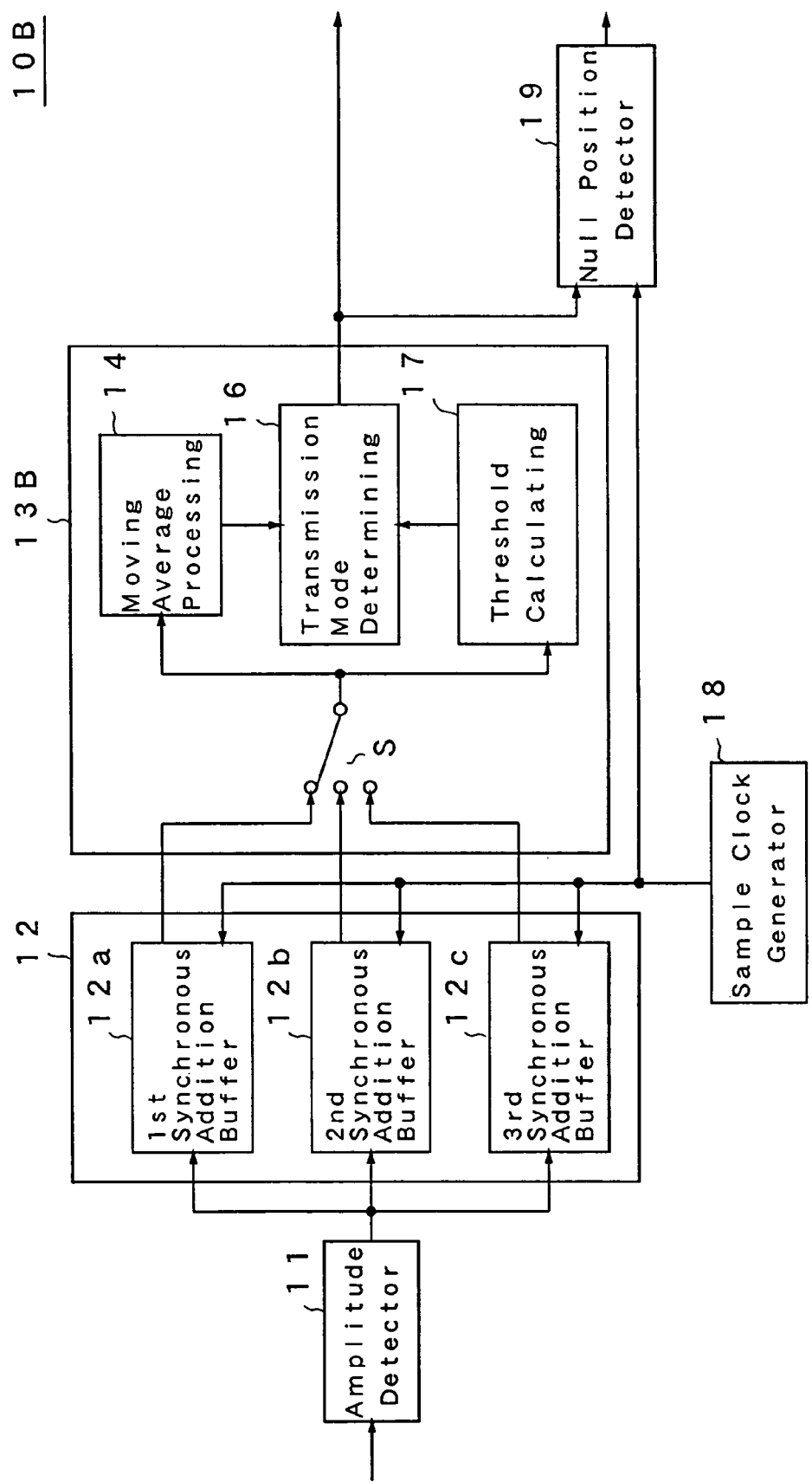
FIG. 20 is a structural view of a null symbol detection device according to a second embodiment of the present invention.

Next, a null symbol detection device according to a second embodiment of the present invention will be described. FIG. 20 is a structural view of a null symbol detection device 10B according to the second embodiment of the present invention. This null symbol detection device 10B is configured so as to include, as in the first embodiment, an amplitude detector 11, a synchronous addition buffer group 12, a transmission mode determination processor 13B, a sample clock generator 18 and a null position detector 19. The transmission mode determination processor 13B has a selector S, a moving average processing unit 14, a transmission mode determining unit 16 and a threshold calculating unit 17.

The transmission mode determination processor 13B successively switches outputs of synchronous addition buffers in the synchronous addition buffer group 12 by using the selector S, calculates the average value of synchronous addition data stored in each of the synchronous addition buffers, calculates a threshold for detecting a transmission mode from the average value and calculates a moving average of the synchronous addition data. Further, the minimum value of the moving average operation is compared with the threshold in order to determine a transmission mode.

The threshold calculating unit 17 fetches data stored in a synchronous addition buffer which has completed the synchronous addition operation among the first, second and third synchronous addition buffers 12a, 12b and 12c via the selector S and calculates a threshold used for determining a transmission mode. The transmission mode determining unit 16 compares the minimum value of the moving average operation detected in the moving average processing unit 14 with a threshold calculated in the threshold calculating unit 17. If the minimum value of the moving average operation is smaller than the threshold, a mode providing the minimum value of the moving average operation is detected as the transmission mode of a currently received signal.

In accordance with this embodiment, the synchronous addition number for the synchronous addition buffers 12a, 12b and 12c is fixed. For example, the synchronous addition number for the respective synchronous addition buffers is four. The third synchronous addition buffer 12c completes the synchronous addition in 24 msec×4, i.e., 96 msec. The second synchronous addition buffer 12b completes the synchronous addition in 48 msec×4, i.e., 192 msec. The first synchronous addition buffer 12a completes the synchronous addition in 96 msec×4, i.e., 384 msec. Namely, the third synchronous addition buffer firstly completes the synchronous addition, then the second synchronous addition buffer and finally the first synchronous addition buffer. Thus, the selector S is switched in this order.

The threshold calculating unit 17 fetches data at sampling points stored in the synchronous addition buffer that has completed the synchronous addition and calculates an average value. The threshold calculating unit 17 sets a value which is much smaller than the average value, e.g., ½ of the average value as a threshold. Then, the minimum value of the moving average operation and the address of synchronous addition buffer providing the minimum value of the moving average operation are detected.

The transmission mode determining unit 16 compares the threshold set in the threshold calculating unit 17 with the minimum value of the moving average operation detected in the moving average processing unit 14. Then, if the minimum value of the moving average operation is smaller than the threshold, the transmission mode determining unit 16 determines a transmission mode corresponding to the minimum value as a transmission mode of a currently received signal. When the minimum value of the moving average operation that is smaller than the threshold is not provided in the synchronous addition buffer currently selected by the selector S, the selector S is switched. The transmission mode determining unit 16 successively detects a transmission mode by using the minimum value of the moving average operation that has not been used for determining a transmission mode and the corresponding threshold.

When a transmission mode is detected in the transmission mode determining unit 16, the null position detector 19 estimates, as in the first embodiment, the null symbol start position in accordance with the expression (1). When there exists different transmission modes with the same null symbol period as the transmission modes 2 and 3 for European DAB, a transmission mode having a wider null symbol width is firstly detected. Thus, a transmission mode with wide null symbol width is not determined by mistake as a transmission mode with narrow null symbol width, and the correct transmission mode can be detected.

In accordance with this embodiment, the third synchronous addition buffer 12c firstly completes its synchronous addition. Thus, the modes 2 and 3 corresponding to 24 msec of the null symbol repetition period are detected. As the null symbol width of the mode 2 is wider than that of the mode 3, the transmission mode determining unit 16 firstly detects the mode 2. When the transmission mode determining unit 16 detects the mode 2, the null position detector 19 estimates a null position and a pulse is generated at the estimated null position.

When the transmission mode determining unit 16 does not detect the mode 2, the mode 3 is detected. When the mode 3 is not detected, the transmission mode determining unit 16 performs transmission mode detection in the order of the mode 4 and the mode 1 until a mode is determined. At the time when either of the modes is detected, the null position detector 19 generates a pulse indicating a null position. When the modes cannot be detected at all, the transmission mode determining unit 16 outputs a message that the transmission mode cannot be determined. In this case, there is an effect of informing a user that a desired broadcast wave is not received.

In accordance with the second embodiment, mode detection is successively performed from a synchronous addition buffer that has completed the synchronous addition operation. Thus, the time required for the mode determination can be reduced. As a result, a null symbol can be detected faster.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-357748 filed on Dec. 10, 2002 is hereby incorporated by reference.

What is claimed is:

1. A null symbol detection device used for receivers for a digital broadcasting system which repeatedly transmits a null symbol with smaller transmission power than those of other symbols during a fixed period, where at least one of a null symbol repetition period and a null symbol width is different depending on at least one transmission mode, and in which the longer said null symbol repetition period becomes, the wider said null symbol width becomes, said null symbol detection device comprising:

an amplitude detector operable for detecting an envelope of at least one of an intermediate frequency signal and a baseband signal;

a synchronous addition buffer group having a plurality of synchronous addition buffers for synchronously adding data obtained by sampling an output of said amplitude detector at a fixed sample period during said null symbol repetition period corresponding to said at least one of transmission modes to be received;

a transmission mode determination processor operable for performing a moving average operation upon all synchronous addition data rows stored in said at least one of synchronous addition buffers of said synchronous addition buffer group, and for determining a transmission mode by detecting, with respect to a transmission mode to be received, a minimum value of the moving average operation and an address of said at least one of synchronous addition buffers providing the minimum value; and a null position detector operable for detecting, in accordance with a transmission mode determined in said transmission mode determination processor, a null symbol position from the address providing the minimum value of the moving average operation, and for generating a synchronous pulse at a start point of the null symbol position.

2. A null symbol detection device according to claim 1, wherein said transmission mode determination processor includes:

a moving average processing unit for performing a moving average operation in which, with respect to all of the synchronous addition data rows stored in at least one synchronous addition buffer of said synchronous addition buffer group, an average value of adjacent m sampling values is calculated and the sampling point is successively moved, and for detecting the minimum value of the moving average operation and the address of said at least one synchronous addition buffer providing the minimum value for the transmission mode to be received;

a correction processing unit for correcting the minimum value of the moving average operation for each of the transmission modes performed in said moving average processing unit in accordance with a synchronous addition number and a time width of the moving average operation; and a transmission mode determining unit for comparing corrected minimum values of the moving average operation for the respective transmission modes to determine the transmission mode to be received.

3. A null symbol detection device according to claim 2, wherein the time width of the moving average operation in said moving average processing unit is equal to or less than the null symbol width of transmission mode having null symbol repetition period equal to a synchronous addition period of said at least one synchronous addition buffer.

4. A null symbol detection device according to claim 2, wherein in said synchronous addition buffer group, synchronous addition is performed for numbers predetermined for each of said synchronous addition buffers, and a time period required for the synchronous addition is equal to a time period of said buffers with different synchronous addition periods.

5. A null symbol detection device according to claim 2, wherein said correction processing unit normalizes the minimum value of the moving average operation calculated in said moving average processing unit by a value obtained by multiplying the synchronous addition buffer of said synchronous addition buffer group, an average value of adjacent m sampling values is calculated and the sampling point is successively moved, and for detecting the minimum value of the moving average operation and the address of said at least one of synchronous addition buffer providing the minimum value for the transmission mode to be received;

a threshold calculating unit for calculating thresholds for detecting a transmission mode by said synchronous addition data stored in said synchronous at least one addition buffer; and a transmission mode determining unit for comparing the minimum value of the moving average operation calculated in said moving average processing unit with a threshold calculated in said threshold calculating unit to determine the transmission mode to be received.

6. A null symbol detection device according to claim 2, wherein said transmission mode determining unit compares the minimum value of the moving average operation corresponding to each of the transmission modes corrected in said correction processing unit with a predetermined threshold, and detects the minimum value among results of the moving average operation smaller than the predetermined threshold to determine a transmission mode, and when the minimum value smaller than the predetermined threshold is not provided, determines that a determination of the transmission mode is impossible.

7. A null symbol detection device according to claim 1, wherein
said transmission mode determination processor includes:
a moving average processing unit for performing a moving average operation in which, with respect to all of the synchronous addition data rows stored in said at least one of period equal to a synchronous addition period of said at least one of synchronous addition buffer.

8. A null symbol detection device according to claim 7, wherein
the time width of the moving average operation in said moving average processing unit is equal to or less than the null symbol width of a transmission mode having null symbol repetition synchronous addition number by data corresponding to the time width of the moving average operation.

9. A null symbol detection device according to claim 7, wherein
said synchronous addition buffer group performs the synchronous addition for same synchronous addition numbers regardless of the null symbol repetition period.

10. A null symbol detection device according to claim 7, wherein
said transmission mode determining unit detects all of the transmission modes to be received and, when detection of transmission mode cannot be performed successfully, outputs a mode undefined message indicating that the detection of the transmission mode to be received is impossible.

11. A null symbol detection device according to claim 2, wherein
the transmission mode to be received is in conformity with European Digital Audio Broadcasting (DAB) standard (ETS300401).

12. A null symbol detection device according to claim 7, wherein
the transmission mode to be received is in conformity with European Digital Audio Broadcasting (DAB) standard (ETS300401).

13. A null symbol detection device according to claim 11, wherein
said synchronous addition buffer group has three buffers which perform synchronous addition with periods of 24 msec, 48 msec and 96 msec, respectively.

14. A null symbol detection device according to claim 12, wherein
said synchronous addition buffer group has three buffers which perform synchronous addition with periods of 24 msec, 48 msec and 96 msec, respectively.

15. A null symbol detection device according to claim 11, wherein
in said synchronous addition buffer group, when a sample period of synchronous addition data in the synchronous addition buffer with a period of 24 msec is 1, a sample period of synchronous addition data in the synchronous addition buffer with a period of 48 msec is 2, and a sample period of synchronous addition data in the synchronous addition buffer with a period of 96 msec is 4.

16. A null symbol detection device according to claim 12, wherein
in said synchronous addition buffer group, when a sample period of synchronous addition data in the synchronous addition buffer with a period of 24 msec is 1, a sample period of synchronous addition data in the synchronous addition buffer with a period of 48 msec is 2, and a sample period of synchronous addition data in the synchronous addition buffer with a period of 96 msec is 4.

17. A null symbol detection device according to claim 16, wherein
in said synchronous addition buffer group, by using data sampled in the same period regardless of the synchronous addition period, the synchronous addition buffer with a period of 96 msec synchronously adds average values for four sample data, the synchronous addition buffer with a period of 48 msec synchronously adds average values for two sample data, and the synchronous addition buffer with a period of 24 msec synchronously adds one sample data.

18. A null symbol detection device according to claim 11, wherein
said moving average processing unit performs a moving average operation upon the number of samples corresponding to 0.5 τ to 1.0 τ in which τ indicates the null symbol width of the respective transmission modes.

19. A null symbol detection device according to claim 12, wherein
said moving average processing unit performs a moving average operation upon the number of samples corresponding to 0.5 τ to 1.0 τ in which τ indicates the null symbol width of the respective transmission modes.

20. A null symbol detection device used for receivers for a digital broadcasting system which repeatedly transmits a null symbol with smaller transmission power than those of other symbols during a fixed period, which has at least one transmission mode, where at least one of a null symbol repetition period and a null symbol width is different depending on at least one transmission mode, and in which the longer said null symbol repetition period becomes, the wider said null symbol width becomes, said null symbol detection device comprising:
an amplitude detector operable for detecting an envelope of at least one of an intermediate frequency signal and a baseband signal;
a synchronous addition buffer group having at least one synchronous addition buffer for synchronously adding data obtained by sampling an output of said amplitude detector at a fixed sample period during said null symbol repetition period corresponding to said at least one of transmission modes to be received;
a transmission mode determination processor operable for performing a moving average operation upon all synchronous addition data rows stored in said at least one of synchronous addition buffer of said synchronous addition buffer group, and for determining a transmission mode by detecting, with respect to a transmission mode to be received, a minimum value of the moving average operation and an address of said at least one synchronous addition buffer providing the minimum value; and
a null position detector operable for detecting, in accordance with a transmission mode determined in said transmission mode determination processor, a null symbol position from the address providing the minimum value of the moving average operation, and for generating a synchronous pulse at a start point of the null symbol position,
said transmission mode determination processor includes:
a moving average processing unit for performing a moving average operation in which, with respect to all of the synchronous addition data rows stored in at least one synchronous addition buffer of said synchronous addition buffer group, an average value of adjacent m sampling values is calculated and the sampling point is successively moved, and for detecting the minimum value of the moving average operation and the address of said at least one synchronous addition buffer providing the minimum value for the transmission mode to be received;

a correction processing unit for correcting the minimum value of the moving average operation for each of the transmission modes performed in said moving average processing unit in accordance with a synchronous addition number and a time width of the moving average operation; and a transmission mode determining unit for comparing corrected minimum values of the moving average operation for the respective transmission modes to determine the transmission mode to be received.

21. A null symbol detection device used for receivers for a digital broadcasting system which repeatedly transmits a null symbol with smaller transmission power than those of other symbols during a fixed period, which has at least one transmission mode, where at least one of a null symbol repetition period and a null symbol width is different depending on at least one transmission mode, and in which the longer said null symbol repetition period becomes, the wider said null symbol width becomes, said null symbol detection device comprising:

an amplitude detector operable for detecting an envelope of at least one of an intermediate frequency signal and a baseband signal;

a synchronous addition buffer group having at least one synchronous addition buffer for synchronously adding data obtained by sampling an output of said amplitude detector at a fixed sample period during said null symbol repetition period corresponding to said at least one of transmission modes to be received;

a transmission mode determination processor operable for performing moving average operation upon all synchronous addition data rows stored in said at least one of synchronous addition buffer of said synchronous addition buffer group, and for determining a transmission mode by detecting, with respect to a transmission mode to be received, a minimum value of the moving average operation and an address of said at least one synchronous addition buffer providing the minimum value; and a null position detector operable for detecting, in accordance with a transmission mode determined in said transmission mode determination processor, a null symbol position from the address providing the minimum value of the moving average operation, and for generating a synchronous pulse at a start point of the null symbol position, said transmission mode determination processor includes:

a moving average processing unit for performing a moving average operation in which, with respect to all of the synchronous addition data rows stored in said at least one of synchronous addition buffer of said synchronous addition buffer group, an average value of adjacent m sampling values is calculated and the sampling point is successively moved, and for detecting the minimum value of the moving average operation and the address of said at least one of synchronous addition buffer providing the minimum value for the transmission mode to be received;

a threshold calculating unit for calculating thresholds for detecting a transmission mode by said synchronous addition data stored in said synchronous at least one addition buffer; and a transmission mode determining unit for comparing the minimum value of the moving average operation calculated in said moving average processing unit with a threshold calculated in said threshold calculating unit to determine the transmission mode to be received.

* * * * *

UNITED STATES PATENT AND TRADEMARK OFFICE
CERTIFICATE OF CORRECTION

PATENT NO. : 7,292,669 B2
APPLICATION NO. : 10/730271
DATED : November 6, 2007
INVENTOR(S) : Hiroki Furukawa It is certified that error appears in the above-identified patent and that said Letters Patent is hereby corrected as shown below:

Column 14
in claim 5, lines 38–53 "buffer of said synchronous addition buffer group, an average value of adjacent m sampling values is calculated and the sampling point is successively moved, and for detecting the minimum value of the moving average operation and the address of said at least one of synchronous addition buffer providing the minimum value for the transmission mode to be received;
a threshold calculating unit for calculating thresholds for detecting a transmission mode by said synchronous addition data stored in said synchronous at least one addition buffer; and
a transmission mode determining unit for comparing the minimum value of the moving average operation calculated in said moving average processing unit with a threshold calculated in said threshold calculating unit to determine the transmission mode to be received." should read
-- number by data corresponding to the time width of the moving average operation. --

Column 15
in claim 7, lines 7–9, "period equal to a synchronous addition period of said at least one of synchronous addition buffer." should read -- synchronous addition buffer of said synchronous addition buffer group, an average value of adjacent m sampling values is calculated and the sampling point is successively moved, and for detecting the minimum value of the moving average operation and the address of said at least one of synchronous addition buffer providing the minimum value for the transmission mode to be received;
a threshold calculating unit for calculating thresholds for detecting a transmission mode by said synchronous addition data stored in said synchronous at least one addition buffer; and
a transmission mode determining unit for comparing the minimum value of the moving average operation calculated in said moving average processing unit with a threshold calculated in said threshold calculating unit to determine the transmission mode to be received. --

UNITED STATES PATENT AND TRADEMARK OFFICE
CERTIFICATE OF CORRECTION

PATENT NO. : 7,292,669 B2
APPLICATION NO. : 10/730271
DATED : November 6, 2007
INVENTOR(S) : Hiroki Furukawa It is certified that error appears in the above-identified patent and that said Letters Patent is hereby corrected as shown below:

Column 15
in claim 8, lines 15–17, "synchronous addition number by data corresponding to the time width of the moving average operation." should read -- period equal to a synchronous addition period of said at least one of synchronous addition buffer. --

Signed and Sealed this

Fifteenth Day of April, 2008

JON W. DUDAS
*Director of the United States Patent and Trademark Office*